United States Patent [19]

Branlard et al.

[11] 4,101,481
[45] Jul. 18, 1978

[54] PROCESS FOR THE MANUFACTURE OF STABLE POLYCHLOROPRENE LATEX

[75] Inventors: Paul Branlard, Grenoble; Jean Pierre Merle, Echirolles, both of France

[73] Assignee: Société Distugil, Paris, France

[21] Appl. No.: 810,388

[22] Filed: Jun. 27, 1977

[30] Foreign Application Priority Data

Jul. 2, 1976 [FR] France .................. 76 20292

[51] Int. Cl.² .................................... C08L 11/02
[52] U.S. Cl. .......................... 260/23.7 A; 260/27 BB; 260/29.7 N; 260/29.7 NR; 526/217; 526/220
[58] Field of Search ........................... 526/220, 217; 260/29.7 N, 29.7 NR, 23.7 A, 27 BB

[56] References Cited

U.S. PATENT DOCUMENTS

| 2,692,250 | 10/1954 | Walter | 260/29.7 N |
| 2,758,103 | 8/1956 | Henson et al. | 260/29.7 N |
| 3,347,814 | 10/1967 | Hatala | 260/29.7 N |
| 3,808,183 | 4/1974 | Branlard et al. | 526/30 |
| 3,872,043 | 3/1975 | Branlard et al. | 260/23.7 H |
| 3,899,459 | 8/1975 | Branlard et al. | 260/27 BB |
| 3,925,340 | 12/1975 | Khan | 526/224 |
| 3,984,609 | 10/1976 | Branlard et al. | 526/78 |

Primary Examiner—Eugene C. Rzucidlo
Attorney, Agent, or Firm—Browdy and Neimark

[57] ABSTRACT

Polymerization of chloroprene in an alkaline aqueous emulsion provides an improved latex by adding a specific amide to the emulsion, the amide being insoluble in water, soluble in the chloroprene and not being hydrolyzed by NaOH. The presence of an amide of this type makes it possible to obtain polychloroprene latices stabilized against ageing.

10 Claims, No Drawings

PROCESS FOR THE MANUFACTURE OF STABLE POLYCHLOROPRENE LATEX

FIELD OF THE INVENTION

The present invention relates to polymeric latices, and, more particularly, an improved polychloroprene latex and process for the manufacture thereof.

BACKGROUND OF THE INVENTION

The polymerization of chloroprene in aqueous alkaline emulsion in the presence of emulsifying agents is well known. Depending on the ultimate use of the polychloroprene, diverse formulations have been proposed (e.g. use of dissolved sulphur, use of a chain transfer agent, addition of a peptizing agent and the like) which make it possible to obtain diverse types of rubber within a specific viscosity range. See, for example, U.S. Pat. Nos. 3,808,183; 3,872,043; 3,984,609 and 3,899,459.

A main processing obstacle encountered by manufacturers resides in the difficulty of obtaining a product viscosity which remains at a constant value from the time when the polymerization reaction has ended to the time when the polymer is isolated from the latex. This period is generally between 10 and 100 hours. In a general way, the viscosity tends to increase during storage. This phenomenon, known as "latex ageing," is due to a crosslinking which is more or less rapid depending on the operating conditions. The increase in the viscosity may or may not be accompanied by the appearance of a gel which results in the polychloroprene becoming partially insoluble in formulations for adhesives and in a perceptible modification of the physical and rheological properties of the polymers.

An improved process for the polymerization of chloroprene in the presence of mercaptans, according to which an hydrophilic amide containing hydroxyl groups is added to the reaction medium has recently been proposed (U.S. Pat. application Ser. No. B 468 198, now U.S. Pat. No. 3,925,340). The object of the addition of the amide is to increase the degree of conversion of the monomer into the polymer without the formation of a gel.

SUMMARY OF THE INVENTION

The process according to the present invention makes it possible to overcome the obstacle mentioned above and obtain a polychloroprene latex which is stabilized against ageing. The product can be used to produce adhesives which are less expensive and do not easily separate into two phases.

It has been discovered that certain amides provide remarkable protection against latex ageing and make it possible to obtain polychloroprene latices which have a viscosity which remains virtually unchanged during storage.

DETAILED DESCRIPTION OF EMBODIMENTS

The process according to the invention comprises polymerizing chloroprene, optionally with another copolymerizable monomer, in alkaline aqueous emulsion in the presence of emulsifying agents and of a catalyst which provides free radicals, and is characterized in that, per 100 parts of the starting monomer(s), there is added to the emulsion from 0.2 to 4 parts by weight of an amide of the general formula

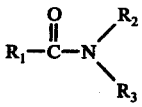

in which $R_1$ represents a $C_3$-$C_{18}$ alkyl or alkenyl radical or an aryl radical or an arylalkyl radical, it being possible for the aryl and alkyl groups to be linked by an oxygen, nitrogen or sulfur hetero-atom; and $R_2$ and $R_3$ are identical or different and represent hydrogen, a linear or branched $C_1$-$C_{12}$ alkyl or alkenyl radical or an aryl radical or an arylalkyl radical, it being possible for the aryl and alkyl groups to be linked by a hetero-atom and $R_2$ and $R_3$ taken together can form a heterocyclic ring with the nitrogen, with the proviso that, if $R_2 = R_3 = H$, the carbon in the α-position relative to the group $C = O$ of the amide must be substituted by at least one group having a positive inductive effect and, if $R_2 = H$ with $R_3$ an alkyl group, said $R_3$ must possess at least two carbon atoms when $R_1$ does not possess a group having a positive inductive effect on the carbon in the α-position relative to the group $C = O$ of the amide. The molecular weight of the amide is less than 600.

The characteristics of the inductive effect are defined in the literature. Publications which may be consulted are: Chimie Organique Moderne (Modern Ogranic Chemistyr) J-D Roberts and M-C Caserio-Edition Francaise Ediscience (1968) pages 387-389 and Mecanismes electroniques en Chimie Organique (Electronic Mechanisms in Organic Chemistry) M. Julia - Gauthier Villars Paris (1967) pages 11-12 Examples of groups having a positive inductive effect are methyl, ethyl, isopropyl radicals.

Properties common to the amides claimed which correspond to the general definition are that they are insoluble in water at the concentrations used, that they cannot be hydrolyzed by sodium hydroxide and that they are soluble in chloroprene. These characteristics are essential. An amide which is soluble in water or an amide which insoluble in water but is also insoluble in chloroprene is ineffective for protection against ageing. These amides are contrasted with those of application B 468 198 because of the hydrophilic character of the latter due to their structure, such amides having a different function from that of the amides according to the present invention and bringing about a different result.

In the general formula, $R_1$ can be a linear or branched aliphatic or cycloaliphatic radical. If $R_1$ is an aryl radical or an arylalkyl radical, the aryl grouping can be substituted by one or more substituents, such as halogens, $NO_2$ or a $C_1$-$C_4$ aliphatic radical. Suitable aryl radicals are, for example, the phenyl, benzyl, naphthyl and phenanthryl groups. The arylalkyl radicals are preferably combinations of $C_6$-$C_{14}$ aryl groups and straight chain or branched $C_2$-$C_6$ alkyl groups.

$R_2$ and $R_3$ can be identical or different, linear or branched and substituted or unsubstituted. Moreover, $R_2$ and $R_3$ can be combined in a single heterocyclic group, the nitrogen atom being an integral part of this heterocyclic group (an example being the pyrrolyl radical). If $R_1$, or $R_2$ or $R_3$, is an arylalkyl radical, the aryl and alkyl groups can be linked by a hetero-atom such as oxygen, nitrogen or sulphur.

Examples which may be mentioned of amides in which $R_1$ represents an aryl radical are amides derived from benzoic acid, phenanthrylic acid, and naphthalic acid and from their substituted halogenated and/or nitrated and/or alkylated derivatives.

Examples which may be mentioned of amides in which $R_1$ is represented by an arylalkyl radical are the amides derived from phenylacetic acid, phenylacrylic acid, and phenoxycarboxylic acids, such as the phenoxyisopropionamides and phenoxybutyramides, amides derived from benzothiofurane, such as the benzothienylformamides, and also their substituted halogenated and/or nitrated and/or alkylated derivatives.

The amides can be introduced into the reaction medium at any stage of the polymerization, at the start of the reaction, in the course of the reaction or even after polymerization, before stripping of the residual monomer. For reasons of convenience, the addition is preferably made at the time the reactants are introduced to the polymerization vessel.

The amount of the specific amide can vary between 0.2 and 4 parts by weight per 100 parts of chloroprene monomer introduced, but is prefeably between 0.5 part and 2 parts. Specific amides introduced in a proportion of less than 0.2 part do not have a sufficiently noticeable influence on the ageing of the polychloroprenes claimed to justify their use. Specific amides introduced in a proportion of more than 4 parts produce a very marked retarding effect on the rate of polymerization and/or are accompanied by precipitation of the said amides from the reaction medium, which leads to clogging of the polymerization vessel, precluding industrial use of these products in such quantities.

Apart from the fact that the specific amides are used, the process according to the invention is carried out by means of conventional techniques for the emulsion polymerization of chloroprene.

The chloroprene monomer can be replaced, to the extent of up to 50% of its weight, by another monomer which has at least one ethylenic double bond and is copolymerizable with chlropene. Among the monomers which are known to be copolymerizable with chloroprene, there may be mentioned vinylaromatic compounds, such as styrene, vinyltoluenes and vinylnaphthalenes, acrylic and methacrylic acids and also their ester and nitrile derivatives, such as ethyl acrylate, methyl methacrylate and acrylonitrile, aliphatic conjugated diolefines, such as 1,3-butadiene, isoprene, 2,3-dichloro-1,3-butadiene and 2,3-dimethyl-1,3-butadiene, and vinyl ethers and vinyl ketones, such as methyl vinyl ether, vinyl acetate and methyl vinyl ketone.

The polymerization is carried out in aqueous emulsion using conventional catalysts which provide free radicals. Peroxide compounds such as alkali metal persulphates or ammonium persulphates, hydrogen peroxide, cumene peroxide and dibenzoyl peroxide, as well as alkali metal ferricyanides and ammonium ferricyanates may be mentioned in particular.

The concentration of monomer present in the aqueous emulsion is not critical; but it is generally between 30 and 60% of the total weight of the emulsion. The polymerization is carried out in an inert atmosphere and in the absence of oxygen. The polymerization temperature is between 0° and 80° C, preferably between 10° and 50° C. The pH is between 11 and 13.

Any of the conventional emulsifying agents can be used to prepare the chloroprene emulsion. Among these there may be mentioned the water-soluble salts, especially the sodium, potassium or ammonium salts, of the following compounds: long chain fatty acids, colophony or derivatives of colophony, such as colophony obtained from wood, pine resin or tall oil; disproportionated or partially polymerized colophony; sulphates of fatty alcohols, alkyl-sulphates or alkylsulphonates; salts of alkyl-aryl-sulphonic acids and also the condensation products of formaldehyde with arylsulphonic acids such as napthalenesulphonic acid.

While the emulsifying system used in the present invention may be any of those conventionally used, according to a particular embodiment, such emulsifying system comprises 1.8 to 3% of resin derivatives and from 0.1 to 1% of a saturated or unsaturated fatty acid or of an alkali metal salt of this acid, the percentages being expressed by weight relative to the starting monomer.

The usual modifying agents or other agents can be present in the emulsion. For example, the polymerization can be carried out in the presence of elementary sulphur to give a sulphur-modified polychloroprene. It is also possible to use chain transfer agents, such as alkylmercaptans, iodoform, benzoyl iodide or the disulphide and polysulphide derivatives of a dialkyl-xanthogen, such as diisopropyl-xanthogen disulphide or diethyl-xanthogen disulphide. It is also possible to add peptizing agents, such as tetraalkylthiuram disulphides or alkali metal alkyldithiocarbamates, at the end of the polymerization.

The percentage conversion of the monomer depends on the polymerization temperature and varies from 70 to 85%. The polymerization can be stopped at any time by a conventional polymerization inhibitor. The unreacted monomer is recovered from the medium by means of a flash distillation.

The introduction of an amide according to the present invention is particularly advantageous when manufacturing latex which can be used in adhesives. The use of polychloroprene as the base product in glues and adhesives containing solvents has been known for a long time. It is known that the rubber is generally mixed with a small amount of zinc oxide on the one hand and, on the other hand, with phenolic resins which are reacted with an excess of magnesium carbonate. However, at the end of a more or less lengthy period, the final adhesive mixture has the undesirable characteristic of separating into two phases. This phenomenon, which is known to those skilled in the art as phase separation, is very troublesome commercially.

The applicant company, in U.S. Pat. No. 3,872,043, has indicated a means by which this phenomenon can be prevented, this means consisting of polymerizing chloroprene in the presence of small amounts of resin derivatives and of a moderate amount of a saturated or unsaturated fatty acid. However, under these conditions and, above all, when thiurams are added at the end of the polymerization, increased natural ageing of the rubber is observed. The use of modified rosin acid derivatives, as described in U.S. Pat. No. 3,899,459, provides a rubber which has relatively good resistance to ageing and which can be used to make up adhesive mixtures which do not display the phenomenon of phases separation. However, this process necessitates the use of extremely pure modified rosin acid derivatives which do not contain unmodified resin derivatives, so that the need to purify the industrial products can constitute an obstacle to their use. The use of amides according to the present invention in the process for the manufacture of polychloroprene latex using small amounts of resin derivatives provides, less expensively, a rubber which has excellent resistance to natural ageing and does not produce the phenomenon of phase separation in the adhesives in which it is incorporated.

Thus, according to a preferential embodiment, the process consists of polymerizing chloroprene in an alkaline aqueous emulsion in the presence of an emulsifying system, the composition of which by weight, relative to chloroprene, is from 1.8 to 3% of resin derivatives and from 0.1 to 1% of a saturated or unsaturated fatty acid or of an alkali metal salt of this acid, and is characterized in that from 0.2 to 4% by weight, relative to the monomer, of a specific amide defined above are added.

The examples which follow are given by way of illustration. They must not be interpreted as limiting the scope of the invention. In all of the examples, the proportions of emulsifier, colophony or lauryl-sulphate, are deliberately very small in order better to demonstrate the protective effect of the amides claimed in respect of the ageing of polychloroprenes.

EXAMPLE 1

Comparative Experiment

The following constituents are charged into a polymerization vessel:

| | | |
|---|---|---|
| Chloroprene | 100 | parts by weight |
| Water | 100 | " |
| Resin acid: disproportionated colophony (registered trade mark: Phedre V from Messrs. PASSICOS) | 2 | " |
| Sodium oleate | 0.4 | " |
| Sodium hydroxide (100 %) | 0.46 | " |
| Sodium salt of methylene-bis-alkyl-naphthalenesulphonic acids (Distabex LS, registered trademark of Compagnie Francaise de Matieres Colorantes) | 0.875 | " |
| n-Dodecyl-mercaptan | 0.145 | " |
| With an initial catalyst comprising: | | |
| A/Ferrous sulphate (7 $H_2O$) | 0.00384 | " |
| Disodium salt of ethylenediamine-tetraacetic acid | 0.00577 | " |
| Sodium hydroxide | 0.00124 | " |
| Water | 1.026 | " |
| B/Dithionite | 0.0294 | " |
| Water | 0.588 | " |

The polymerization is carried out for 10 hours at + 10° C, aqueous ammonium persulphate solution being introduced at a suitable rate. The polymerization is stopped at a coversion of 80% by mixing in:

| | | |
|---|---|---|
| Chloroprene | 0.8 | part by weight |
| Sodium lauryl-sulphate | 0.02 | " |
| Phenothiazine | 0.01 | " |
| Water | 2.93 | " |

Finally, 0.4 part of ditertiary butyl-paracresol, dissolved in chloroprene (2.93 parts), is added to the latex.

Steam stripping and the isolation of the latex are carried out according to methods conventionally used. In particular, the isolation is effected by coagulating the latex on a drum cooled to −20° C. The film obtained is washed and then dried.

EXAMPLE 2

The procedure according to Example 1 is repeated but 0.2, 0.5, 1 and 2 parts by weight of methyl-chlorophenoxyisopropionamide are respectively added to he starting emulsion.

EXAMPLE 3

The procedure according to Example 1 is repeated except that the solution added at the end of the operation, after stopping the conversion at 80%, is replaced by the following:

| | | |
|---|---|---|
| Di-tertio butyl paracresol | 0.4 | part by weight |
| Tetraethylthiuram disulphide | 0.750 | " |
| Sodium lauryl-sulphate | 0.140 | " |
| Chloroprene | 5.86 | " |
| Water | 15 | " |

One test is effected without amide and two tests are carried out with, respectively, 1 and 2 parts by weight of methylchlorophenoxyisopropionamide, which is added to the starting emulsion.

The results relating to the increase in the Mooney viscosity of the rubber prepared in Examples 1, 2 and 3 and stored for three days at 70° C in an oven, after ageing of the latex, are given in Table 1.

EXAMPLES 4 TO 6

Example 1 is repeated but the polymerization temperature is 45° C. Furthermore, in Example 4 the polymerization is stopped at a 70% degree of conversion of the chloroprene introduced.

The protective effect of the methylchlorophenoxyisopropionamide (Example 6) is determined by mesuring the Mooney viscosity and the gel content of the rubber prepared in this way and stored for three days at 70° C in an oven, after ageing of the latex. The results are given in Table II.

EXAMPLE 7

The process of preparation according to Example 1 is modified as follows:

The resin acids and the sodium oleate are replaced by 1.5 parts of sodium lauryl-sulphate. In addition, X parts of methylchlorophenoxyisopropionamide are added when the reactants are introduced. The polymerization temperature is 45° C.

The results relating to the increase in the Mooney viscosity and the gel content of the rubber prepared in this way and stored for 3 days at 70° C in an oven, after ageing of the latex, are given in Table III.

EXAMPLE 8

In this example the action of the various amdies is studied. The procedure according to Example 1 is followed, X parts of a specific amide being added each time when the reactants are introduced.

The results are given in Table IV.

The Mooney viscosity given in all Examples corresponds to the ASTM method D 1646 - 72, named "ML 1+4".

The symbol "Δ ML 1+4" means the increase in the Mooney viscosity of the rubber after a storage of the rubber for 3 days at 70° C in a oven.

TABLE I

ACTION OF METHYLCHLOROPHENOXYISOPROPIONAMIDE DURING AGEING OF THE POLYCHLOROPRENE LATICES

| Example No. | Parts introduced / 100 parts chloroprene | Δ ML 1 + 4 after storing the latex at 40° C | | |
|---|---|---|---|---|
| | | 0 | 5 Hours | 0 Hours |
| 1 | 0 | + 2 | +17 | +28 |
| 2 | 0.2 | + 4 | +15 | +10 |

TABLE I-continued
ACTION OF METHYLCHLOROPHENOXYISOPROPIONAMIDE DURING AGEING OF THE POLYCHLOROPRENE LATICES

| Example No. | Parts introduced / 100 parts chloroprene | ΔML 1 + 4 after storing the latex at 40° C | | |
|---|---|---|---|---|
| | | 0 | 5 Hours | 0 Hours |
| | 0.5 | − 1 | + 2 | + 8 |
| | 1 | + 1 | + 7 | + 5 |
| | 2 | − 3 | + 5 | + 1 |
| 3 | 0 | +12 | +32 | +38 |
| | 1 | −20 | −13 | − 7 |
| | 2 | − 2 | − 9 | − 8 |

TABLE II
ACTION ON METHYLCHLOROPHENOXYISOPROPIONAMIDE DURING AGEING OF POLYCHLOROPRENE LATICES

| Example No. | Parts of amide introduced / 100 parts chloroprene | STORAGE TIME OF THE LATEX AT 40° C | | | | | |
|---|---|---|---|---|---|---|---|
| | | 0 Hour | | 5 Hours | | 10 Hours | |
| | | ΔML 1+4 | % gel/PCP | ΔML 1+4 | % gel/PCP | ΔML 1+4 | % gel/PCP |
| 4 | 0 | +4 | 0 | + 6 | 0 | + 6 | 15 |
| 5 | 0 | +8 | 0 | +13 | 60 | +13 | 70 |
| 6 | 0.5 | +2 | 0 | + 7 | 60 | + 9 | 70 |
| | 1 | 0 | 0 | + 5 | 15 | + 6 | 50 |
| | 1.5 | +1 | 0 | + 3 | 0 | + 1 | 0 |
| | 2 | +1 | 0 | 0 | 0 | 0 | 0 |

TABLE III
ACTION OF METHYLCHLOROPHENOXYISOPROPIONAMIDE DURING AGEING OF POLYCHLOROPRENE LATICES

| Parts of amide introduced/100 parts chloroprene | STORAGE TIME OF THE LATEX AT 40° C | | | | | |
|---|---|---|---|---|---|---|
| | 0 Hours | | 5 Hours | | 10 Hours | |
| | ΔML 1+4 | % gel/PCP | ΔML 1+4 | % gel/PCP | ΔML 1+4 | % gel/PCP |
| 0 | +8 | 0 | +15 | 30 | +17 | 60 |
| 0.25 | +6 | 0 | +15 | 30 | +12 | 40 |
| 0.5 | +4 | 0 | +10 | 15 | +10 | 30 |
| 0.75 | +2 | 0 | + 5 | 0 | + 7 | 10 |
| 1 | 0 | 0 | + 2 | 0 | + 4 | 0 |

TABLE IV
ACTION OF THE AMIDES DURING AGEING OF POLYCHLOROPRENE LATICES

| AMIDE | Parts introduced/100 parts chloroprene | ΔML 1 + 4 After storing the latex at 40° C | | |
|---|---|---|---|---|
| | | 0 | 5 hours | 40 hours |
| CONTROL (*) Example 1 | 0 | +2 | +17 | +28 |
| 2,4-dichlorophenoxy-isopropionamide | 1.1 | 0 | +2 | +3 |
| | 2.1 | +2 | 0 | −6 |
| methyl-chlorophenoxyisopropionamide | 1 | +1 | +7 | +5 |
| | 1.9 | +2 | +1 | 0 |
| N-ethyl-methylchlorophenoxy-propionamide | 1.1 | 0 | +3 | −3 |
| | 2.2 | −1 | +1 | +1 |
| N-diethyl-methylchloro-phenoxyisopropionamide | 1 | +1 | +2 | −1 |
| | 2 | +3 | −1 | +3 |
| N-isopropyl-methylchloro-phenoxyisopropionamide | 1.2 | −5 | −2 | +11 |
| | 2.3 | −4 | 0 | 0 |
| N-diisopropyl-methylchloro-phenoxyisopropionamide | 2.7 | +2 | +1 | +4 |
| N-phenyl-methylchlorophenoxy-isopropionamide | 1.3 | +6 | + 2 | + 8 |
| | 2.6 | 0 | +10 | +10 |
| N-pyrrolyl-2,3-dichloro-phenoxyisopropionamide | 2 | −2 | −1 | +2 |
| Phenoxy-isobutyramide | 2 | −1 | 0 | −1 |
| N-isopropylbenzamide | 1 | 1 | −2 | +6 |
| | 2 | 0 | 0 | +3 |
| N-ethyl-para-tert.-butyl-benzamide | 1 | −1 | 0 | +4 |
| | 2 | +2 | −3 | 0 |
| N-diethyl-para-tert.-butyl-benzamide | 1.1 | +1 | −1 | −3 |
| | 2.1 | +2 | +1 | −2 |
| N-isopropyl-para-tert.-butyl-benzamide | 1 | +3 | +7 | +10 |
| | 2 | −5 | −2 | < 5 |
| N-diisopropyl-para-tert.-butyl-benzamide | 1.2 | −4 | +3 | −8 |
| | 2.4 | −1 | 0 | +5 |
| N-phenyl-para-tert.-butyl-benzamide | 1.2 | 0 | +7 | + 6 |
| | 2.3 | +6 | +9 | +13 |
| N-isopropyl-para-tert.-butyl-meta-nitro-benzamide | 2 | 0 | +1 | −2 |

TABLE IV-continued
ACTION OF THE AMIDES DURING AGEING OF POLYCHLOROPRENE LATICES

| AMIDE | Parts introduced/100 parts chloroprene | ΔML 1 + 4 After storing the latex at 40° C | | |
|---|---|---|---|---|
| | | 0 | 5 hours | 40 hours |
| N-diisopropyl-para-tert.-butyl-meta-nitro-benzamide | 2 | +2 | 0 | −1 |
| N-methyl-N-butyl-para-tert.-butyl-meta-bromobenzamide | 2 | +2 | 0 | +3 |
| N-ethyl-N-allyl-para-iso-propyl-meta-nitrobenzamide | 2 | +2 | +1 | +1 |
| N-methyl-2-furyl-2,5-di-chloro-benzamide | 2 | 0 | +5 | −1 |
| N-p-isopropyl-m-chloro-phenyl-p-chloro-benzyl-amide | 1 | +3 | +7 | +9 |
| N-isopropyl-3-chloro-benzo-thienylformamide | 2 | −1 | −1 | 0 |
| N-diisopropyl-3-chloro-benzothienylformamide | 2 | +2 | −1 | 0 |
| N-methyl-N-butyl-3-chloro-benzothienylformamide | 2 | −3 | +2 | 0 |
| N-diethyl-cyclohexyl-form-amide | 2 | +1 | −2 | +1 |
| N-isopropylmethacrylamide | 1.8 | +1 | 0 | −2 |
| N-isopropyloleamide | 2 | +3 | 0 | +1 |
| N-dioctylricinoleamide | 1.5 | −1 | −4 | −3 |
| dehydroabietamide | 2 | 0 | +2 | −1 |
| N-methyl-N-methyl-1-propyne-2-cinnamide | 2 | +1 | 0 | +3 |

It will be obvious to those skilled in the art that various changes may be made without departing from the scope of the invention and the invention is not to be considered limited to what is described in the specification.

What is claimed is:

1. In a process for the preparation of a chloroprene polymer latex by polymerizing chlorophene in an alkaline aqueous emulsion in the presence of an emulsifying agent and of a catalyst which provides free radicals, the improvement comprising adding to said emulsion, per 100 parts of starting monomer, from 0.2 to 4 parts by weight of an amide of the formula

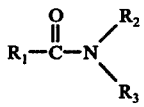

in which $R_1$ is $C_3$ – $C_{18}$ alkyl or alkenyl or aryl or arylalkyl, or arylalkyl with the aryl and alkyl linked by a hetero-atom; and $R_2$ and $R_3$ are identical or different and are each hydrogen, a linear or branched $C_1$ – $C_{12}$ alkyl or alkenyl or an aryl or an arylalkyl, or arylalkyl with the aryl and alkyl linked by a hetero-atom or $R_1$ and $R_3$ taken together form a heterocyclic ring with nitrogen as the hetero-atom with the proviso that, if $R_2 = R_3 = H$, the carbon in the α-position relative to the group $C = O$ must be substituted by at least one group having a positive inductive effect and, if $R_2 = H$ and $R_3$ is an alkyl group, said $R_3$ must possess at least two carbon atoms when $R_1$ does not possess a group having a positive inductive effect on the carbon in that α-position relative to the group $C = O$ of the amide, said amide being substantially insoluble in water at the concentration used, soluble in chloroprene and non-hydrolyzable by NaOH.

2. Process according to claim 1, wherein the emulsifying agent comprises 1.5 to 3% of resin derivatives and 0.1 to 1% of a saturated or unsaturated fatty acid or an alkali metal salt thereof.

3. Process according to claim 1, wherein said amide is a phenoxyisopropionamide.

4. Process according to claim 3, wherein said phenoxyisopropionamide is methyl-chlorophenoxyisopropionamide.

5. A process in accordance with claim 1, wherein said chloroprene is homopolymerized.

6. A process in accordance with claim 1, wherein up to 50% by weight based on the total monomer weight of a monomer copolymerizable with said chloroprene is inter-polymerized with said chloroprene.

7. A process in accordance with claim 1, wherein said amide is present in an amount of 0.5 to 2 parts per 100 parts of monomer.

8. A process in accordance with claim 1, wherein $R_1$ is $C_3$ – $C_{18}$ alkyl or alkenyl, phenyl, benzyl, naphthyl, phenanthryl, or any of phenyl, benzyl, naphthyl or phenanthryl substituted by halogen, $NO_2$ or $C_1$ – $C_4$ aliphatic radical, or arylalkyl of $C_6$ – $C_{14}$ aryl and $C_2$ – $C_6$ alkyl.

9. As a new product, polychloroprene latex prepared according to claim 1.

10. In an adhesive composition comprising a mixture of solvent, chloroprene polymer, zinc oxide and phenolic resin, the improvement wherein said chloroprene polymer is obtained by the process of claim 1.

* * * * *

UNITED STATES PATENT AND TRADEMARK OFFICE
CERTIFICATE OF CORRECTION

PATENT NO. : 4,101,481
DATED : July 18, 1978
INVENTOR(S) : Paul Branlard and Jean Pierre Merle It is certified that error appears in the above-identified patent and that said Letters Patent are hereby corrected as shown below:

Column 9, line 14, delete $R_1$ and insert $R_2$

Signed and Sealed this

Twentieth Day of February 1979

[SEAL]

Attest:

RUTH C. MASON
*Attesting Officer*

DONALD W. BANNER
*Commissioner of Patents and Trademarks*